United States Patent [19]
Nakazaki et al.

[11] Patent Number: 5,834,034
[45] Date of Patent: Nov. 10, 1998

[54] APPARATUS FOR PRODUCING RIBBED HOSE

[75] Inventors: Norikazu Nakazaki, Toyama; Satoshi Yamakita; Yoshikazu Nabeshima, both of Uozu, all of Japan

[73] Assignee: Toyox Co., Ltd., Toyama-ken, Japan

[21] Appl. No.: 606,574

[22] Filed: Feb. 26, 1996

[30] Foreign Application Priority Data

Feb. 28, 1995 [JP] Japan .................................. 7-064870

[51] Int. Cl.⁶ .................................................. B29C 47/02
[52] U.S. Cl. ............... 425/113; 156/244.13; 156/244.15; 264/171.12; 264/171.13; 264/171.29; 264/211.23; 264/260; 425/301; 425/382.3; 425/461; 425/463
[58] Field of Search ...................... 118/300, 323; 156/244.11, 244.13, 244.15, 244.24, 390; 425/91, 92, 94, 105, 113, 381, 382.3, 461, 463, 464, 465; 264/171.12, 171.13, 171.29, 173.18, 176.1, 211.21, 211.23, 246, 259, 260

[56] References Cited

U.S. PATENT DOCUMENTS

| | | | |
|---|---|---|---|
| 2,446,057 | 7/1948 | Morin | 425/113 |
| 2,456,304 | 12/1948 | Morin | 425/113 |
| 2,465,482 | 3/1949 | Rhodes | 425/113 |
| 2,566,846 | 9/1951 | Martin | 425/113 |
| 2,674,007 | 4/1954 | Allemann et al. | 425/113 |
| 2,834,047 | 5/1958 | Morin | 425/113 |
| 3,284,851 | 11/1966 | Zernay | 425/382.3 |
| 3,289,250 | 12/1966 | Zernay | 425/382.3 |
| 3,411,182 | 11/1968 | Nevin | 425/113 |
| 3,461,499 | 8/1969 | Nevin et al. | 425/113 |
| 4,181,486 | 1/1980 | Saito | 156/244.13 |
| 5,051,081 | 9/1991 | Kammori | 156/244.15 |

FOREIGN PATENT DOCUMENTS

| | | |
|---|---|---|
| 2-231121 | 9/1990 | Japan . |
| 231121 | 9/1990 | Japan . |
| 270501 | 5/1994 | Japan . |

*Primary Examiner*—Jay H. Woo
*Assistant Examiner*—Joseph Leyson
*Attorney, Agent, or Firm*—Steinberg, Raskin & Davidson, P.C.

[57] ABSTRACT

An apparatus for producing a ribbed hose which is capable of effectively producing a ribbed hose irrespective of a diameter or size of a hose while preventing the apparatus from being large-sized. A cylinder is formed therein with a hose feed passage and a first drive mechanism is arranged for driving the cylinder. Also, a screw is arranged in parallel to the hose feed passage and driven by a second drive mechanism. The screw is provided on a distal end thereof with a nozzle, which is adapted to revolve around the hose to form a rib on a hose.

5 Claims, 2 Drawing Sheets

APPARATUS FOR PRODUCING RIBBED HOSE

BACKGROUND OF THE INVENTION

This invention relates to an apparatus for producing a ribbed hose, and more particularly to an apparatus for producing a hose provided on an outer periphery thereof with a rib of a spiral or helical shape.

An apparatus for producing a ribbed hose which has been conventionally proposed is typically constructed in such a manner as shown in Japanese Patent Application Laid-Open Publication No. 231121/1990. The apparatus proposed is intended to forcedly feed a rib material of synthetic resin, which is used for forming a rib on a hose, from a feed port to a nozzle. The nozzle is rotated around the hose and the hose is transferred through a center of rotation of the nozzle. Thus, in the conventional apparatus, the nozzle is rotated around the hose while discharging a rib material, so that the hose is formed thereon with a rib of a helical shape. A helical pitch of the rib is determined depending on a speed of rotation of the nozzle and a speed of feed transfer of the hose. For example, an increase in speed of rotation of the nozzle while keeping a speed of feed of the hose constant causes a helical pitch of the rib to be reduced. On the contrary, a decrease in speed of rotation of the nozzle while keeping the speed of feed of the hose constant or an increase in speed of feed of the hose while keeping the rotation speed of the nozzle constant causes an increase in helical pitch of the rib.

In order to increase a speed of production of the ribbed hose in the conventional apparatus constructed as described above, it is required to increase a speed of feed of the hose. In this instance, in order to keep a helical pitch of the rib constant, it is required to increase a speed of rotation of the nozzle by an amount corresponding to an increase in speed of feed of the hose. However, an increase in speed of rotation of the nozzle causes a configuration of the rib formed to be irregular unless the nozzle is fed with a sufficient amount of rib material.

Unfortunately the conventional apparatus is constructed so as to forcedly feed the rib material, resulting in an increase in speed of feed of the rib material being limited to an insufficient level. Thus, the conventional apparatus fails to produce a ribbed hose with improved productive efficiency.

Also, forced feed of the rib material as described above which is carried out in the conventional apparatus disadvantageously increases a pressure acting on the rib material, resulting in the rib material often leaking from the apparatus during feed of the rib material. Such leakage of the rib material fails to permit the rib material to be stably fed to the nozzle, leading to disadvantages such as an undesirable variation in dimensions of the rib or a configuration thereof, and the like.

Further, the conventional apparatus causes generation of heat due to friction between the synthetic resin rib material and a slide surface of the apparatus. Unfortunately, the heat possibly results in carbonization or deterioration of the rib material, leading to deterioration of quality of the rib formed.

In order to solve such problems as described above, the assignee proposed an apparatus for producing a ribbed hose as disclosed in Japanese Patent Application No. 270501/1984, of which the disclosure is incorporated herein by reference. The apparatus proposed is so constructed that a cylinder is provided therein with a screw and the screw is formed therein with a hose feed passage so as to extend along a central axis thereof.

Unfortunately, in the apparatus proposed, formation of a rib on a hose increased in diameter requires to increase a diameter of the screw, resulting in the apparatus being large-sized. Also, the apparatus proposed fails to form a hose with a multi-thread rib in which threads are formed of materials from each other, respectively.

SUMMARY OF THE INVENTION

The present invention has been made in view of the foregoing disadvantages of the prior art.

Accordingly, it is an object of the present invention to provide an apparatus for producing a ribbed hose which is capable of effectively producing a ribbed hose irrespective of a diameter or size of a hose while preventing the apparatus from being large-sized.

It is another object of the present invention to provide an apparatus for producing a ribbed hose which is capable of increasing a size of a hose feed passage without large-sizing the apparatus.

It is a further object of the present invention to provide an apparatus for producing a ribbed hose which is capable of ensuring satisfactory feed of a rib material.

It is still another object of the present invention to provide an apparatus for producing a ribbed hose which is capable of producing a multi-thread rib of a helical shape.

It is yet another object of the present invention to provide an apparatus for producing a ribbed hose which is capable of a multi-thread rib of a helical shape wherein threads are formed of material different from each other, respectively.

In accordance with the present invention, an apparatus for producing a ribbed hose is provided. The apparatus includes a support frame means, a cylinder rotatably supported in the support frame means and formed therein with a hose feed passage so as to extend in an axial direction thereof, a first drive mechanism for rotating the cylinder, at least one screw arranged in the cylinder so as to be in parallel to the hose feed passage, a second drive mechanism for rotating the screw, at least one hopper for feeding the screw with a rib material which is a material used for forming a rib on a hose, and a nozzle arranged on an outlet port side of the screw, wherein the cylinder and screw are rotated while feeding a hose.

In a preferred embodiment of the present invention, the support frame means is provided therein with a feed casing. The cylinder is inserted through the feed casing. The feed casing is formed therein with an annular passage so as to surround the cylinder, as well as a feed passage in a manner to be connected to the annular passage in a tangential direction of the annular passage. The cylinder is formed with an inlet port in a manner to be open at the annular passage. The rib material is fed from the hopper through the feed passage, annular passage and inlet port to the screw.

In a preferred embodiment of the present invention, a plurality of the screws are arranged. The inlet port is arranged so as to be common to the screws. A plurality of the hoppers may be arranged in correspondence to the screws so as to feed a plurality of rib materials different from each other from the hoppers to the screws, respectively.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, an apparatus for producing a ribbed hose according to the present invention will be described hereinafter with reference to the accompanying drawings.

Figure 1:
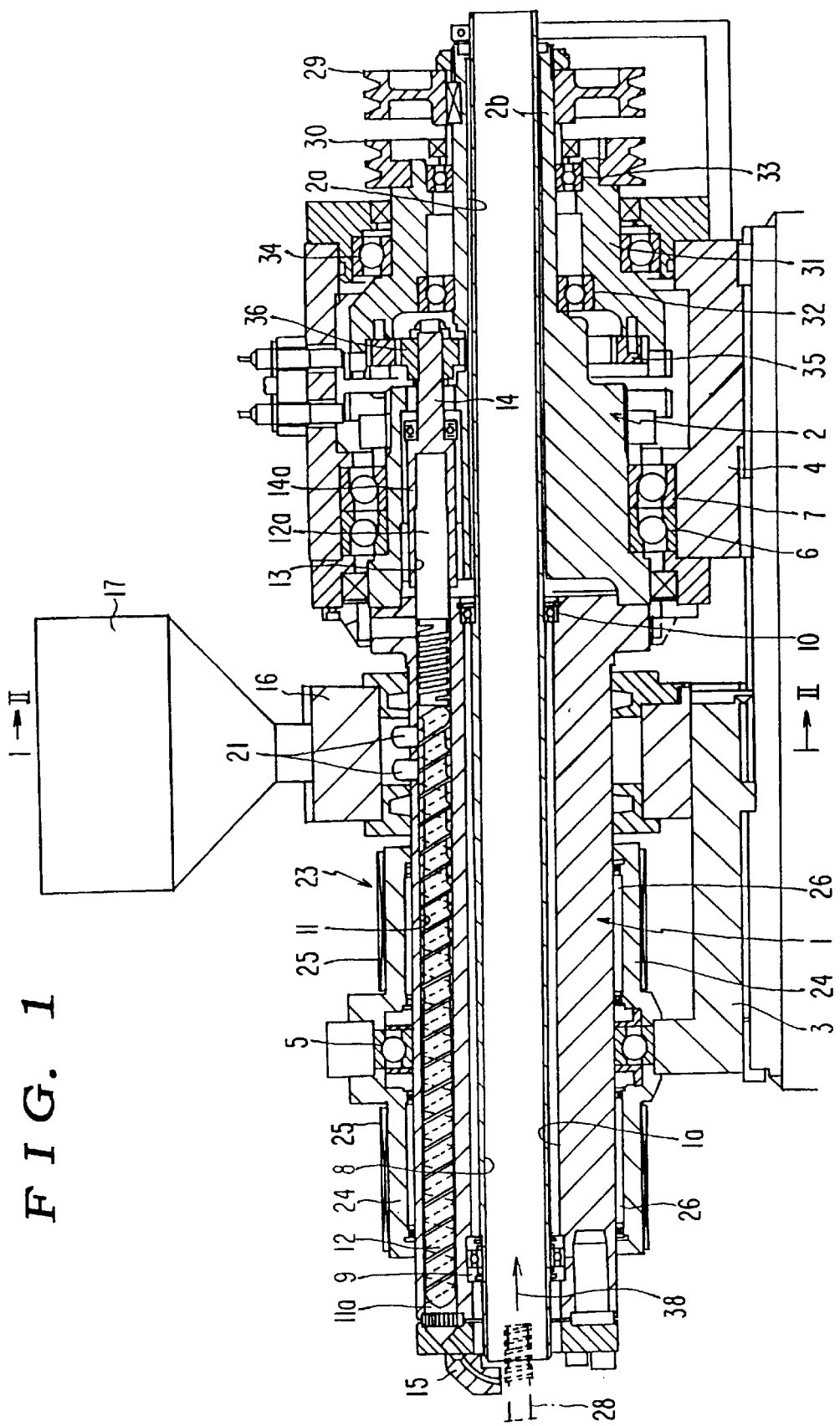
FIG. 1 is a vertical sectional view showing an embodiment of an apparatus for producing a ribbed hose according to the present invention.
Figure 2:
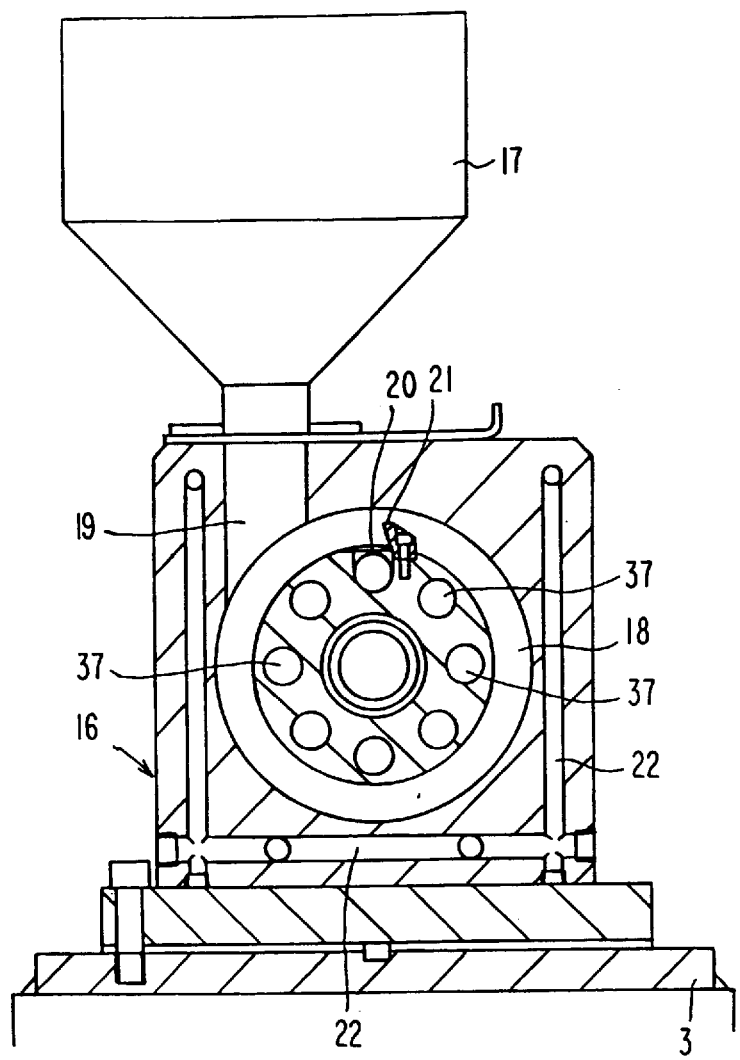
FIG. 2 is a sectional view taken along line II—II of FIG. 1.
Figure 3:
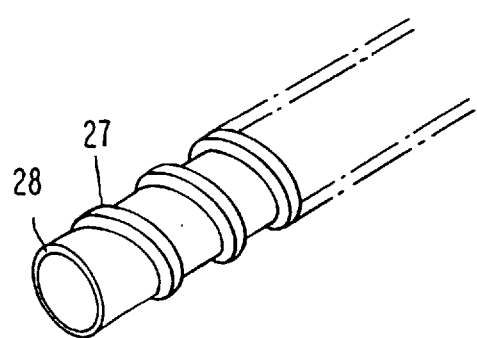
FIG. 3 is a perspective view showing an example of a ribbed hose produced by the apparatus shown in FIG. 1.

Referring first to FIGS. 1 and 2, an embodiment of an apparatus for producing a ribbed hose according to the present invention is illustrated. An apparatus of the illustrated embodiment is generally constructed in such a manner that a cylinder 1 and a rotor 2 are integrally connected to each other and supported in support frames 3 and 4 through a bearing 5 and bearings 6 and 7, respectively.

The cylinder 1 and rotor 2 thus arranged are provided therein with hose feed passages 1a and 2a which comprise through-holes formed through the cylinder 1 and rotor 2 in a manner to extend in an axial direction thereof, respectively. The hose feed passages 1a and 2a have a guide tube 8 inserted therethrough in a manner common to both. The guide tube 8 is supported in the hose feed passages 1a and 2a by bearings 9 and 10. The guide tube 8 is supported in a manner to be rotatable relatively to the cylinder 1 and rotor 2, However, in the illustrated embodiment, the guide tube 8 per se may be stationarily mounted so as to be prevented from being rotated.

The cylinder 1 is also formed therein with a screw hole 11 in a manner to extend in parallel with the hose feed passage 1a and penetrate through the cylinder 1. The screw hole 11 has a screw 12 received therein. The screw 12 is arranged in such a manner that a proximal end portion 12a thereof is outwardly projected from the screw hole 11 so as to extend into a connection hole 13 formed in the rotor 2.

The connection hole 13 also has a drive shaft 14 incorporated therein. The drive shaft 14 is provided at one end thereof with a hollow cylindrical section 14a which is open at one end. The distal end portion 12a of the screw 12 described above is fixedly fitted in the cylindrical section 14a of the drive shaft 14.

The screw hole 11 is provided at a distal end thereof with a outlet port 11a, which is provided with a nozzle 15. The nozzle 15 is detachably connected to the outlet port 11a of the screw hole 11. A type of the nozzle 15 to be used is selected depending on use of the apparatus.

The support frame 3 is provided thereon with a feed casing 16 and the cylinder 1 is arranged so as to extend through the feed casing 16. The feed casing 16 thus arranged is provided thereon with a hopper 17 and formed therein with an annular passage 18, which is defined so as to surround the cylinder 1, as best seen in FIG. 2. The annular passage 18 and hopper 17 are arranged so as to communicate with each other through a feed passage 19 formed in the feed casing 16. The feed passage 19 is connected to the annular passage 18 in a tangential direction of the annular passage 18.

The cylinder 1 is formed at a portion thereof positionally corresponding to the annular passage 18 with an inlet port 20 through which the screw 12 is fed with a rib material or a material used for forming a rib of a spiral or helical shape on an outer surface of a hose, as shown in FIG. 2. Also, the inlet port 20 is provided at an opening thereof with a catch element 21 for positively catching a rib material in the annular passage 18 to force it into the inlet port 20. The catch element 21 is formed so as to be raised from the opening of the inlet port 20. The feed casing 16 is formed with a cooling water passage 22.

The apparatus of the illustrated embodiment also includes a heating unit 23, which is arranged around the cylinder 1 and positioned forwardly of the feed casing 16. The heating unit 23 includes a casing 24 and a heater 25 arranged on an outer surface of the casing 24. Also, the heating unit 23 includes an oil chamber 26 formed by cooperation of an inner surface of the casing 24 with an outer surface of the cylinder 1. Thus, a rib material fed or carried by the screw 12 is heated in proximity to the nozzle 15, to thereby be increased in fluidity.

The rotor 2 is integrally combined with the cylinder 1 and includes a hollow cylindrical section 2b. The cylindrical section 2b is fixedly mounted on an outer end thereof with a first pulley 29, which is operatively connected to an electric motor (not shown).

Thus, a drive mechanism which is defined from the pulley 29 to the electric motor (not shown) constitutes a first drive mechanism of the apparatus of the illustrated embodiment.

Reference numeral 30 designates a second pulley arranged inwardly of the first pulley 2 and fixed on a carrier 31. The carrier 31 is rotatably supported on the cylindrical section 2b of the rotor 2 through bearings 32 and 33 arranged between the cylindrical section 2b and the carrier 31 and a bearing 34 provided outside the carrier 31. The second pulley 30 is operatively connected to the electric motor (not shown), so that a drive mechanism which is thus defined from the pulley 30 to the electric motor constitutes a second drive mechanism of the apparatus of the illustrated embodiment.

The carrier 31 is fixedly mounted thereon with a ring gear 35 and the drive shaft 14 is fixedly mounted on a distal end thereof with a pinion 36, which is engaged with the ring gear 35 of the carrier 31. Thus, when the second drive mechanism is operated to rotate the ring gear 35 together with the carrier 31, the drive shaft 14 is rotated together with the pinion 36. Such rotation of the drive shaft 14 leads to rotation of the screw 12 integrally connected to the drive shaft 14.

The cylinder 1 is formed with a plurality of reserve holes 37, which are arranged so as to extend in parallel to the hose feed passage 1a in substantially the same manner as the screw hole 11. The reserve holes 37 are arranged for the purpose of decreasing a weight of the cylinder 1 and accommodating the cylinder 1 to arrangement of a plurality of the screws 12.

Now, the manner of operation of the apparatus of the illustrated embodiment will be described hereinafter.

First, a hose is inserted into the guide tube 8 and then transferred in a direction indicated at an arrow 38 in FIG. 1. Then, the first drive mechanism is driven to rotate the rotor 2 and cylinder 1 and the second drive mechanism is driven to rotate the screw 12. Concurrently, the hopper 17 is actuated to feed a rib material through the feed passage 19 to the annular passage 18. The feed passage 19, as described above, is connected to the annular passage 18 in a tangential direction of the annular passage 18, so that feed of the rib material may be smoothly carried out, to thereby eliminate problems such as splashing of the rib material and the like.

Thus, when the rib material is fed to the annular passage 18, followed by rotation of the cylinder 1, the catch element 21 catches the rib material in the annular passage 18 to force it into the inlet port 20. The rib material thus fed to the screw 12 is carried toward the outlet port 11a with rotation of the screw 12, followed by flowing of the material out of the nozzle 15.

The nozzle 15 revolves around the hose 28 together with the cylinder 1, so that such flowing of the rib material out of the nozzle 15 as described above permits the rib material to adhere to the periphery of the hose 28, resulting in forming a rib 27 of a helical shape. A helical pitch of the rib 27 is determined depending on a speed of rotation of the cylinder 1 and a speed of transfer of the hose 18.

The rib material flowing out of the nozzle 15 is heated by the heating unit 23, to thereby be increased in flowability, resulting in readily adhering to the hose 28.

A diameter of the hose 28 is regulated by a maximum diameter of the guide tube 8, so that formation of the rib may be effectively applied to the hose 28 of any diameter within a maximum diameter of the guide tube 8. It is a matter of course that this requires replacement of the nozzle 15 depending on a diameter of the hose 28.

In the illustrated embodiment, only one screw 12 is arranged. Alternatively, the illustrated embodiment may be so constructed that a plurality of such screws 12 are respectively arranged in the reserve holes 37 and the nozzle is arranged at an outlet port of each of the reserve holes 37. Such construction permits formation of a multi-thread rib. This permits only one hopper 17 to be arranged for the screws.

Further, the illustrated embodiment may be constructed in such a manner that a plurality of such screws are arranged and correspondingly a plurality of such hoppers 17, feed passages 19 and annular passages 18 are arranged. In such construction, rib materials different from each other are charged in the hoppers 17, respectively, so that a multi-thread rib of a helical shape in which threads are respectively formed of the different rib materials may be formed on the single hose.

As can be seen from the foregoing, the apparatus of the present invention is so constructed that the screw is arranged separately from the hose feed passage. Such construction effectively permits an enlargement of the hose feed passage while keeping the apparatus from being large-sized.

Also, in the apparatus of the present invention, the feed passage may be connected to the annular passage in a tangential direction of the annular passage. Such arrangement of the feed passage prevents splashing of a rib material fed from the feed passage to the annular passage, to thereby ensure smooth feeding of the rib material.

Further, the apparatus of the present invention may be constructed so as to arrange a plurality of the screws, to thereby form a multi-thread rib of a helical shape.

Moreover, the apparatus of the present invention effectively provides a multi-thread rib of a helical shape in which threads are respectively formed of different materials.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An apparatus for producing a ribbed hose, comprising:

support frame means;

a cylinder rotatably supported in said support frame means and formed therein with a hose feed passage so as to extend in an axial direction thereof, said cylinder having an outer peripheral surface;

a first drive mechanism for rotating said cylinder;

at least one screw arranged in said cylinder so as to be in parallel to said hose feed passage;

feeding means for feeding said at least one screw with a rib material;

a second drive mechanism for rotating said at least one screw to direct said rib material to an outlet port of said at least one screw;

a nozzle arranged in flow communication with said outlet port of said at least one screw and structured and arranged to direct said rib material onto a hose being fed through said hose feed passage to form the ribbed hose;

said cylinder and said at least one screw being rotated by said first and second drive mechanisms respectively, while feeding a hose through said hose feed passage; and heating means arranged continuously around said outer peripheral surface of said cylinder for heating said rib material.

2. An apparatus as defined in claim 1, wherein said support frame means is provided therein with a feed casing;

said cylinder being inserted through said feed casing;

said feed casing being formed therein with an annular passage so as to surround said cylinder and a feed passage in a manner to be connected to said annular passage in a tangential direction of said annular passage;

said cylinder being formed with an inlet port in a manner to be open at said annular passage;

said rib material being fed from said hopper through said feed passage, annular passage and inlet port to said screw.

3. The apparatus according to claim 1, wherein said heating means comprises a casing having an inner surface opposed to the outer surface of said cylinder and an outer surface, an oil chamber defined by said inner surface of said casing and the outer surface of said cylinder for retaining oil, and a heater arranged on said outer surface of said casing for heating said oil.

4. The apparatus according to claim 1, wherein said heating means extends substantially between said feeding means and said nozzle.

5. The apparatus of claim 1, wherein said feeding means comprise a hopper.

* * * * *